United States Patent
Iwamasa (10) Patent No.: US 8,416,495 B2
(45) Date of Patent: Apr. 9, 2013

(54) DISPLAY APPARATUS

(75) Inventor: Ryuichi Iwamasa, Tokyo (JP)

(73) Assignee: GK Tech Inc., Tokyo (JP)

( * ) Notice: Subject to any disclaimer, the term of this patent is extended or adjusted under 35 U.S.C. 154(b) by 119 days.

(21) Appl. No.: 12/820,637

(22) Filed: Jun. 22, 2010

(65) Prior Publication Data

US 2010/0328551 A1 Dec. 30, 2010

(30) Foreign Application Priority Data

Jun. 29, 2009 (JP) ................................ 2009-154434

(51) Int. Cl.
*H04N 5/228* (2006.01)

(52) U.S. Cl.
USPC ......................................... 359/451; 359/443

(58) Field of Classification Search .................. 348/222, 348/744; 359/443, 451; 345/156; 434/285
See application file for complete search history.

(56) References Cited

U.S. PATENT DOCUMENTS

| | | | | |
|---|---|---|---|---|
| 2,299,682 A | * | 10/1942 | Conant | 396/351 |
| 3,707,786 A | * | 1/1973 | Clark | 434/286 |
| 5,433,670 A | * | 7/1995 | Trumbull | 472/60 |
| 5,828,363 A | * | 10/1998 | Yaniger et al. | 345/156 |
| 6,176,584 B1 | * | 1/2001 | Best et al. | 353/30 |
| 6,195,102 B1 | * | 2/2001 | McNeil et al. | 345/427 |
| 6,727,971 B2 | * | 4/2004 | Lucas | 352/85 |
| 6,733,136 B2 | * | 5/2004 | Lantz et al. | 353/79 |
| 6,880,939 B2 | * | 4/2005 | Colucci et al. | 353/122 |
| 6,905,218 B2 | * | 6/2005 | Courchesne | 353/122 |
| 7,083,287 B2 | * | 8/2006 | Pate | 353/85 |
| 7,105,753 B1 | * | 9/2006 | Lapstun et al. | 178/19.05 |
| 7,621,647 B1 | * | 11/2009 | Colucci et al. | 353/121 |
| 8,022,893 B2 | * | 9/2011 | Gatley et al. | 345/1.1 |
| 2002/0009699 A1 | * | 1/2002 | Hyodo et al. | 434/285 |
| 2002/0131018 A1 | * | 9/2002 | Lucas | 352/85 |
| 2002/0149752 A1 | * | 10/2002 | Courchesne | 353/122 |
| 2003/0038986 A1 | * | 2/2003 | Washio et al. | 358/474 |
| 2004/0105573 A1 | * | 6/2004 | Neumann et al. | 382/103 |
| 2004/0145709 A1 | * | 7/2004 | Colucci et al. | 353/94 |
| 2005/0151938 A1 | * | 7/2005 | Onaga | 353/94 |
| 2006/0139579 A1 | * | 6/2006 | Kasahara | 353/94 |
| 2007/0097331 A1 | * | 5/2007 | Sadler et al. | 353/79 |

(Continued)

FOREIGN PATENT DOCUMENTS

JP 2003-241648 * 8/2003

OTHER PUBLICATIONS

Nancey P. Y. Yuen et Al, Inexpensive Immersive Projection, IEEE Virtual Reality Mar. 8-12, 2008.*

(Continued)

*Primary Examiner* — Clayton E LaBalle
*Assistant Examiner* — Kevin Butler
(74) *Attorney, Agent, or Firm* — Cozon O'Connor (57) ABSTRACT

To provide a display apparatus which can use a general purpose projector, has a simple structure, including a hemispherical rear projection screen, a projector for projecting an image to be displayed on the rear projection screen, and a computer system for creating an image projected from the projector and characterized in that the computer system includes a recording medium for storing image data of a plane image, creation device that corrects the image data stored in the recording medium and creating image data of a curved image, and a transmission device to transmit the image data of the curved image created by the creation device to the projector.

2 Claims, 12 Drawing Sheets

U.S. PATENT DOCUMENTS

| | | | |
|---|---|---|---|
| 2008/0186415 A1* | 8/2008 | Boud et al. | 348/744 |
| 2008/0204666 A1* | 8/2008 | Spearman | 353/37 |
| 2009/0141190 A1* | 6/2009 | Kroll | 348/744 |
| 2010/0220296 A1* | 9/2010 | DePoar | 353/30 |
| 2011/0164119 A1* | 7/2011 | Jeong | 348/51 |
| 2011/0211256 A1* | 9/2011 | Connor | 359/463 |

OTHER PUBLICATIONS

Ramesh Raskar, Multi-Projector Imagery on Curved Surfaces, Mitsubishi Electric Research Labs.*

Oliver Bimber, Multifocal Projection: A Multiprojector Technique for Increasing Focal Depth, IEEE COmputer Society, May 10, 2006.*

Mark Matthews, Digital Domes and the Future of Planetariums, Planetarian, Dec. 2005.*

C.J. Fluke & P.D. Bourke, Astronomy Visualisation in Reflection, Planetarian Dec. 2005.*

Jon Shaw et Al, Dome Theaters: Spheres of Infleuence, TiLE Proceedings, pp. 59-65, 1998.*

Mitsubishi Electric, Press Release: Announces Seamless Dome Display System with Multiple Projectors, Tokyo, Japan, Feb. 15, 2005.*

* cited by examiner

DISPLAY APPARATUS

CROSS-REFERENCE TO RELATED APPLICATIONS

This application claims the benefit of Japanese Patent Application No. 2009-154434, filed on Jun. 29, 2009, in the Japanese Patent Office, the disclosure of which is incorporated herein by reference.

BACKGROUND OF THE INVENTION

1. Field of the Invention

The invention relates to a display apparatus for displaying a curved image.

2. Description of the Related Art

Conventionally, as a method of projecting an image on a hemispherical screen, a method of individually projecting plural divided images from plural projectors and combining the plural divided images to one image on a hemispherical screen and a method of projecting an image on a hemispherical screen using a wide angle optical system such as a fish eye lens are known (refer to Japanese Patent Application Laid-Open Nos. 2006-033672 and 2003-241648).

However, in the conventional methods, since an image projected from a projector is a plane image, plural projectors are needed or an optical system for converting a plane image to a curved image is needed.

In contrast, Japanese Patent Application Laid-Open No. 2006-330353 discloses a projector in which an optical system capable of converting a plane image to a curved image is contained. According to the projector, although an image that is a curved image is projected from the projector, since the projector is a dedicated projector, a problem arises in that a general purpose projector cannot be used and a manufacturing cost of an overall display apparatus is expensive.

A problem to be solved by the invention is to provide a display apparatus which can use a general purpose projector, has a simple structure, and can be manufactured at low cost.

SUMMARY OF THE INVENTION

To solve the problem, the invention provides a display apparatus described below.

1. A display apparatus comprising a hemispherical rear projection screen, a projector for projecting an image to be displayed on the rear projection screen, and a computer system for creating an image projected from the projector, wherein the computer system comprises a recording medium for storing image data of a plane image, creation means for correcting image data stored to the recording medium and creating image data of a curved image, and transmission means for transmitting the image data of the curved image created by the creation means to the projector.

2. The display apparatus according to the paragraph 1, wherein the rear projection screen is movably installed, the display apparatus comprises detection means capable of detecting displacement of the rear projection screen, and the computer system reads, when the rear projection screen is displaced, image data corresponding to the displacement of the rear projection screen from the image data stored in the recording medium in response to signals output from the detection means, creates image data of a curved image by correcting the image data by the creation means, and transmits the image data of the created curved image to the projector by the transmission means.

3. The display apparatus according to the paragraph 2, wherein the detection means comprise arms for sensing displacement of the rear projection screen, and the arms are coupled with the rear projection screen through joint members.

4. The display apparatus according to the paragraph 2 or 3, wherein the detection means are composed of two-axis displacement sensors and disposed in at least three portions at predetermined intervals.

5. The display apparatus according to the any one of paragraphs 1 to 4, further comprising one or a plurality of plane reflection means that reflect a luminous flux output from the projector and are disposed between the projector and the rear projection screen.

According to the display apparatus described in the paragraph 1, since the computer system comprises the recording medium for storing image data of a plane image, the creation means for correcting image data stored to the recording medium and creating image data of a curved image, and the transmission means for transmitting the image data of the curved image created by the creation means to the projector, it is possible to project an image that is a curved image from one general purpose projector without using an optical system for converting a plane image to a curved image. Thus, since it is not necessary to dispose an optical system capable of converting a plane image to a curved image inside or outside of a projector and further it is not necessary to use plural projectors, the display apparatus has a very simple structure and further can be manufactured at low cost.

According to the display apparatus described in the paragraph 2, since the rear projection screen is movably installed, the display apparatus comprises the detection means capable of detecting displacement of the rear projection screen, and the computer system reads, when the rear projection screen is displaced, image data corresponding to the displacement of the rear projection screen from the image data stored in the recording medium according to signals output from the detection means, creates image data of a curved image by correcting the image data by the creation means, and transmits the image data of the curved image to the projector by the transmission means, the display apparatus can display a curved image in conformity with a movement of the rear projection screen.

According to the display apparatus described in the paragraph 3, since the detection means comprise the arms for sensing displacement of the rear projection screen and the arms are coupled with the rear projection screen through the joint members, the arms can sense a slight motion of the rear projection screen through the joint members with a result that the display apparatus can cause displacement of the rear projection screen to agree with a change of a curved image displayed on the rear projection screen.

According to the display apparatus described in the paragraph 4, since the detection means are composed of two-axis displacement sensors and disposed in at least three portions at predetermined intervals, the display apparatus can find a motion of the rear projection screen three-dimensionally.

According to the display apparatus described in the paragraph 5, since the display apparatus further comprising the one or the plural plane reflection means which reflect a luminous flux output from the projector and are disposed between the projector and the rear projection screen, the display apparatus can reduce a distance between a projection lens of the projector and the rear projection screen with a result that the display apparatus can be made compact.

DESCRIPTION OF THE PREFERRED EMBODIMENTS

Although embodiments of the invention will be explained below referring to the drawings, the invention is by no means limited to the embodiments described below.

First Embodiment

Figure 1:
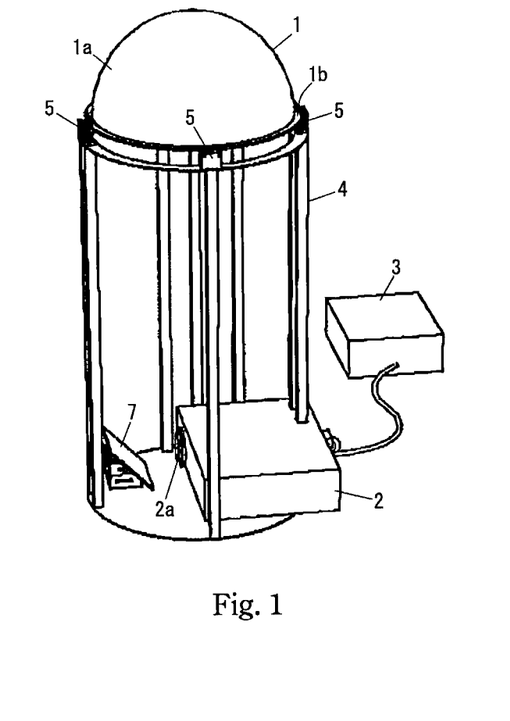
FIG. 1 is a perspective view of a display apparatus according to a first embodiment.

FIG. 1 is a perspective view for illustrating a display apparatus according to an embodiment of the invention. As illustrated in the view, the display apparatus according to the embodiment is configured by including a rear projection screen 1, a projector 2, and a computer system 3.

The rear projection screen 1 is a transparent type screen capable of displaying an image projected on an inner surface of the screen on an outer surface of the screen. The rear projection screen 1 has a screen main body 1a formed in a hemispherical shape. The rear projection screen 1 employed in the embodiment includes a flange 1b which is formed around a circular opening of the rear projection screen 1 and extends outside.

The rear projection screen 1 is supported by a support table 4 having a predetermined height so that the flange 1b is disposed horizontally. Note that although a center axis of the rear projection screen 1 is disposed in a vertical direction in the embodiment, the embodiment may be configured such that the center axis of the rear projection screen 1 is disposed in a direction other than the vertical direction (for example, a horizontal direction).

The rear projection screen 1 may be immovably fixed on the support table 4. The rear projection screen 1 employed in the embodiment is movably disposed. Further, the display apparatus of the embodiment includes detection means 5 capable of detecting displacement of the rear projection screen 1.

Figure 2:
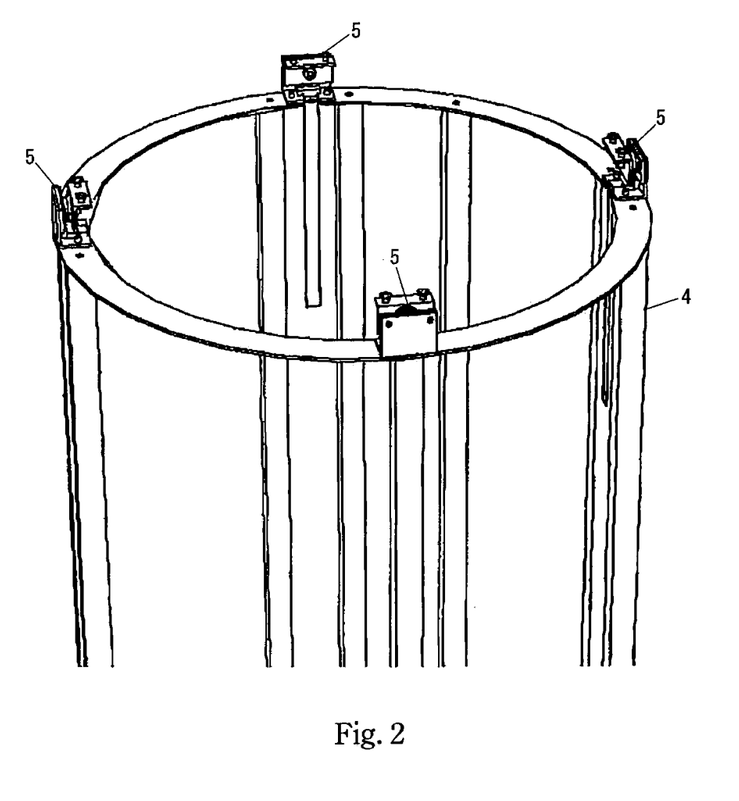
FIG. 2 is a view for illustrating detection means disposed on a support table.

Two-axis displacement sensors for detecting displacement of the rear projection screen 1 in a horizontal direction (an X-axis direction) and a vertical direction (a Y-axis direction) can be used as the detection means 5. The detection means 5 are preferably disposed in at least three portions at predetermined intervals. Disposition of the detection means 5 as described above makes it possible to detect also displacement of an inclination angle of the rear projection screen 1 by combining and analyzing signals output from the respective detection means 5. In the embodiment, a motion of the rear projection screen 1 can be found three-dimensionally and further a load for analyzing the signals from the respective detection means 5 is reduced by disposing four sets of the detection means 5 on the support table 4 at equal intervals as illustrated in FIG. 2.

Figure 3:
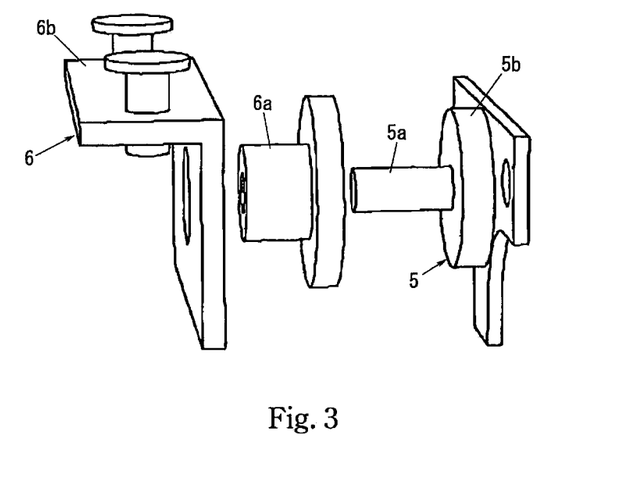
FIG. 3 is an exploded perspective view for illustrating the detection means and a joint member.

As illustrated in FIG. 3, each of the detection means 5 employed in the embodiment includes an arm 5a for sensing displacement of the rear projection screen 1 and a sensor unit 5b for detecting a change of stress to an external force applied to the arm 5a. The detection means 5 is well known as a force sensing pointing device (refer to WO95/16975 A1). However, the detection means 5 is not limited the structure and may have any structure as long as the structure can detect any one or both of a rotation direction (the X-axis direction) or a height direction (the Y-axis direction) of the rear projection screen 1 and further preferably detect displacement of the inclination angle of the rear projection screen 1.

Figure 4:
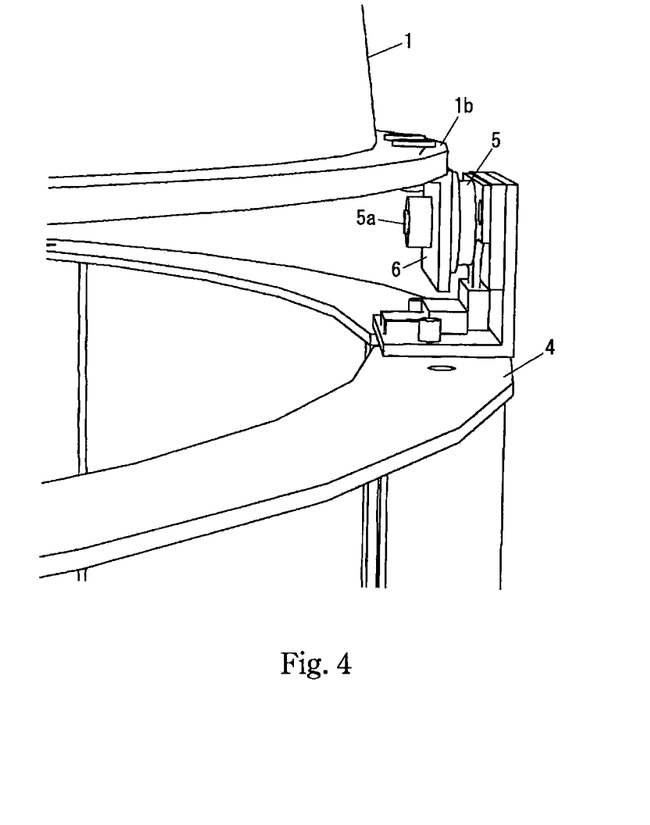
FIG. 4 is a partial perspective view for explaining an installation method of a rear projection screen.

As illustrated in FIG. 4, the rear projection screen 1 employed in the embodiment is coupled with the arms 5a of the detection means 5 through joint members 6 disposed between the rear projection screen 1 and the arms 5a. As illustrated in FIG. 3, each of the joint members 6 is configured by including an elastic cap 6a attached to the arm 5a and a bracket 6b having a hole, with which the elastic cap 6a is engaged, and attached to the flange 1b of the rear projection screen 1. Since the rear projection screen 1 is coupled with the arms 5a through the joint members 6 as described above, when external force is applied to the rear projection screen 1 and the rear projection screen 1 is displaced even slightly, the arms 5a can sense a slight motion of the rear projection screen 1 through the joint members 6. As a result, displacement of the rear projection screen 1 can be caused to agree with a change of a curved image displayed on the rear projection screen 1 by a configuration to be described later.

A general purpose projector, which does not include an optical system for converting a plane image to a curved image, can be used as the projector 2. Although the projector 2 can be disposed at a position at which a luminous flux output from the projector 2 is linearly illuminated to an inner surface of the rear projection screen 1, the disposition increases a distance between a projection lens of the projector 2 and the rear projection screen 1.

Figure 5:
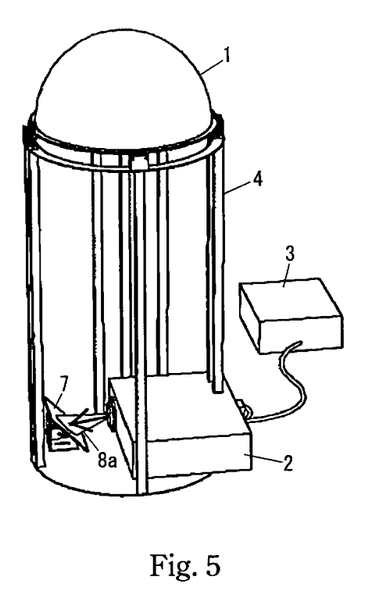
FIG. 5 is a view for explaining an operation of a plane reflection means.
Figure 6:
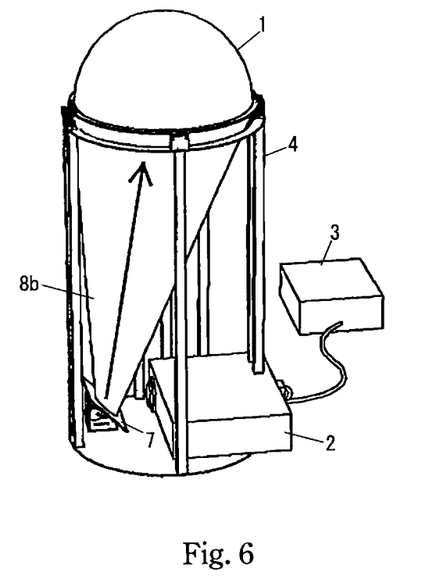
FIG. 6 is a view for explaining the operation of the plane reflection means.

In the embodiment, one plane reflection means 7, which reflects the luminous flux 8a output from the projector 2, is disposed between the projector 2 and rear projection screen 1 as illustrated in FIG. 1. The plane reflection means 7 has a reflection surface composed of a plane surface, and the luminous flux 8a output from the projector 2 travels toward the reflection surface as illustrated in FIG. 5 and is reflected on the reflection surface, and a reflected luminous flux 8b of the luminous flux 8a is illuminated to the inner surface of the rear projection screen 1 as illustrated in FIG. 6.

A configuration in which the plane reflection means 7 is interposed between the projector 2 and the rear projection screen 1 as in the embodiment can lower a height of the apparatus by reducing a distance between a projection lens 2a of the projector 2 and the rear projection screen 1 as illustrated in FIG. 1.

The computer system 3 is configured by including a recording medium, creation means, and transmission means. The recording medium stores image data of a plane image. A conventionally known recording medium, which can be read by control means including a CPU contained in a computer main body can be used as the recording medium.

Figure 7:
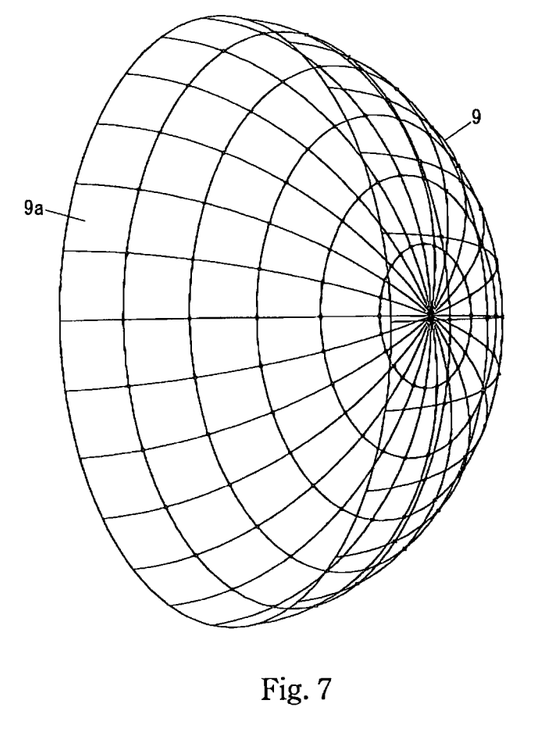
FIG. 7 is a view for illustrating a virtual hemisphere.
Figure 8:
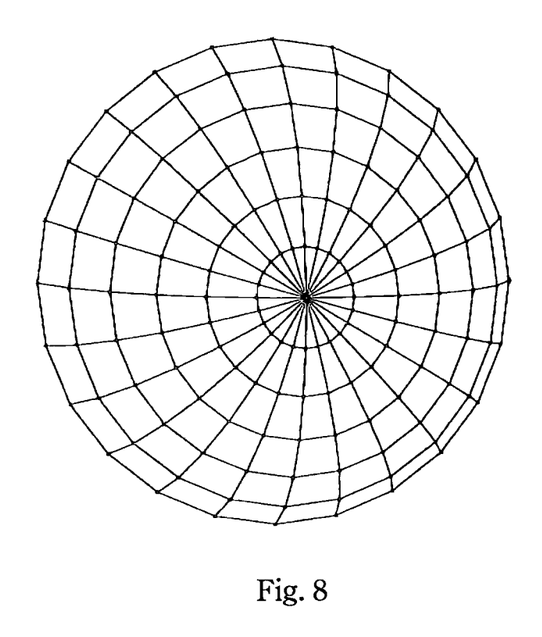
FIG. 8 is a view for illustrating a two-dimensional image created by creation means.

The creation means is composed of a computer program. The program is configured to correct the image data of the plane image stored to the recording medium and to create image data of a curved image. Specifically, a virtual hemisphere 9, which corresponds to a shape of the rear projection screen 1, is divided to many grids 9a as illustrated in FIG. 7, and images of planes corresponding to the respective grids 9a are distorted in conformity with curved surfaces of the respective grids 9a, and one curved image is created in its entirety (that is, a two-dimensional image (refer to FIG. 8), which is displayed as the curved image when the two-dimensional image is projected to the rear projection screen 1).

The control means reads out image data from the recording medium based on a start signal for displaying the curved image on the rear projection screen 1 and corrects the image data according to the creation means. The control means is set to transmit image data created according to the creation means to the projector 2 through the transmission means. The transmission means may be any of wireless transmission means or wired transmission means. The computer system 3 and the projector 2 are set to transmit image data in at least one direction.

The image data of the curved image transmitted from the computer system 3 is received by the projector 2 and projected by the same method as that of projecting image data of a plane image from the projector 2. Thus, according to the display apparatus of the embodiment, an image that is a curved image can be projected from one set of the general purpose projector 2 without using the optical system for converting a plane image to a curved image.

When the rear projection screen 1 is displaced by being applied with external force, the control means of the computer system 3 reads image data corresponding to the displacement of the rear projection screen 1 from the image data stored in the recording medium according to signals output from the detection means 5 and thereafter corrects the image data and creates image data of a curved image by the creation means likewise the above-mentioned case and transmits the image data of the created curved image to the projector 2 by the transmission means. Thus, according to the display apparatus of the embodiment, a curved image can be displayed in conformity with a movement of the rear projection screen 1.

Second Embodiment

Figure 9:
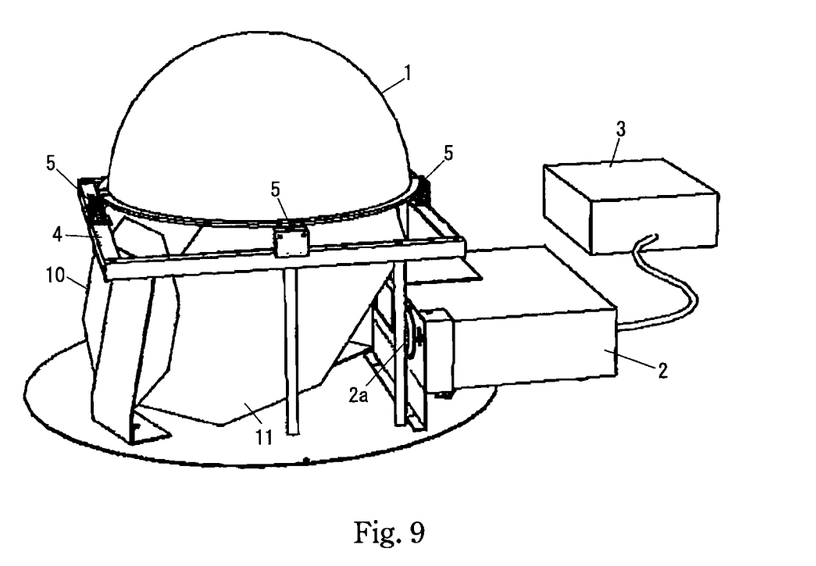
FIG. 9 is a perspective view of a display apparatus according to a second embodiment.

As illustrated in FIG. 9, a display apparatus according to an embodiment is different from the display apparatus according to the first embodiment in that plural plane reflection means 10, 11 are disposed between a projector 2 and a rear projection screen 1.

Figure 10:
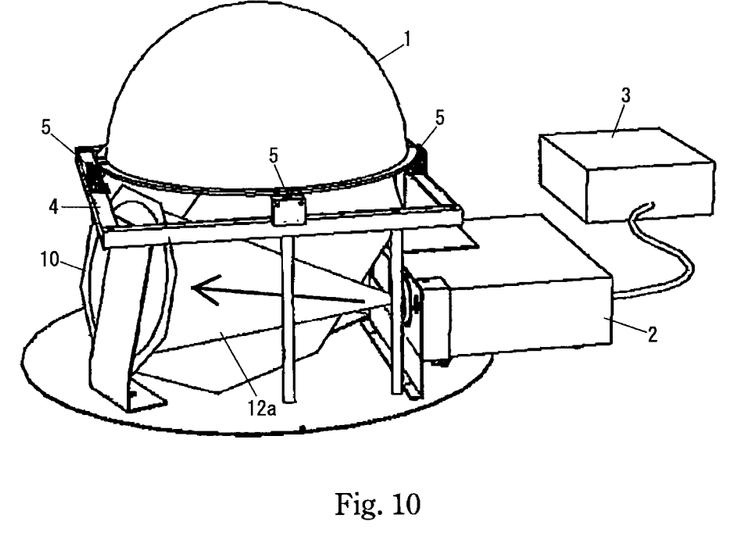
FIG. 10 is a view for explaining an operation of first plane reflection means.
Figure 11:
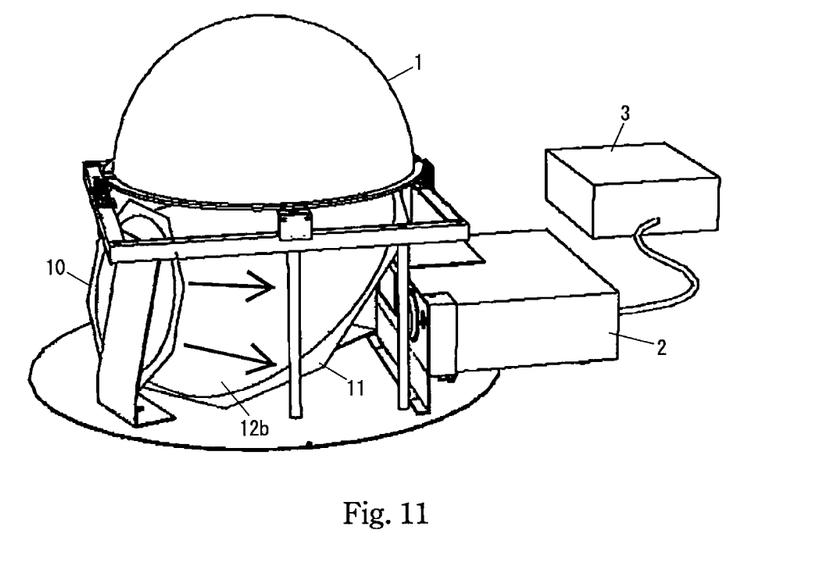
FIG. 11 is a view for explaining the operation of the first plane reflection means.
Figure 12:
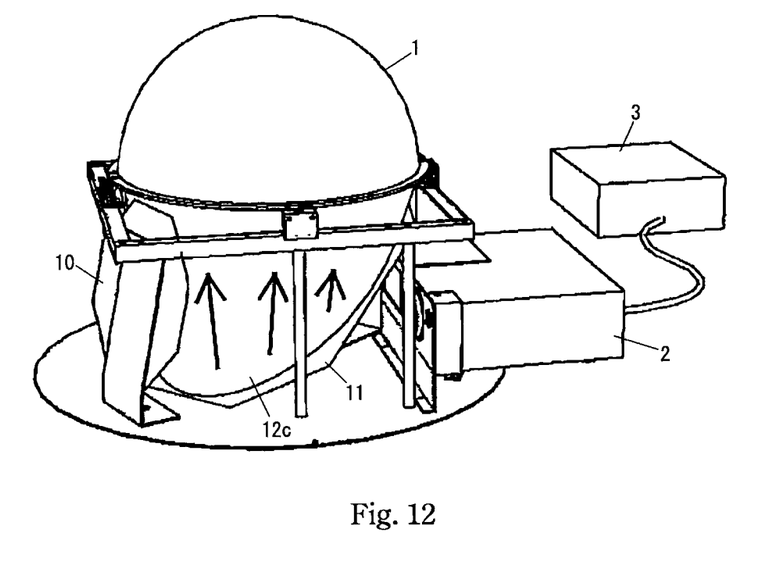
FIG. 12 is a view for explaining an operation of second plane reflection means.

In the embodiment, two sets of the plane reflection means 10, 11 are used and have reflection surfaces composed of plane surfaces, respectively. A luminous flux 12a output from the projector 2 first travels to the reflection surface of the first plane reflection means 10 as illustrated in FIG. 10 and is reflected on the reflection surface of the first plane reflection means 10 as illustrated in FIG. 11, a reflected luminous flux 12b of the luminous flux 12a travels to the reflection surface of the second plane reflection means 11 and then reflected on the reflection surface of the second plane reflection means 11 as illustrated in FIG. 12, and a reflected luminous flux 12c of the reflected luminous flux 12b is illuminated to an inner surface of the rear projection screen 1.

A configuration, in which the plural plane reflection means 10, 11 are interposed between the projector 2 and the rear projection screen 1 as in the second embodiment, realizes a compact apparatus by permitting to lower a height of the apparatus by more reducing a distance between a projection lens 2a of the projector 2 and the rear projection screen 1 as illustrated in FIG. 9.

In the first and second embodiments described above, the image data may be any image data. Various types of image data, for example, image data illustrating the earth, image data illustrating planets other than the earth, image data configured by combining one image to other one or plural images, and the like can be used. Further, a curved image displayed on the rear projection screen 1 is not limited to a still image and may be a moving image. Further, it is also possible to previously create image data of a curved image by the creation means, to record the image data to recording means, to read the image data of the curved image from the recording means when the image data is reproduced, and to display the image data on the rear projection screen 1.

What is claimed is:

1. A display apparatus comprising a movably installed hemispherical rear projection screen, a projector for projecting an image onto the inner surface of the hemispherical rear projection screen to be displayed on the outer surface of the rear projection screen, and a computer system for creating an image projected from the projector, wherein the computer system comprises a recording medium for storing image data of a plane image, creation means for correcting image data stored to the recording medium and creating image data of a curved image, and transmission means for transmitting the image data of the curved image created by the creation means to the projector, and wherein the display apparatus further comprises one or a plurality of plane reflection means disposed between the projector and the inner surface of the hemispherical rear projection screen that reflect a luminous flux output from the projector onto the inner surface of the rear projection screen, and wherein the display apparatus further comprises detection means capable of detecting displacement of the rear projection screen, and the computer system reads, when the rear projection screen is displaced, image data corresponding to the displacement of the rear projection screen from the image data stored in the recording medium in response to signals output from the detection means, creates image data of a curved image by correcting the image data by the creation means, and transmits the image data of the created curved image to the projector by the transmission means, and wherein the detection means are composed of two-axis displacement sensors and disposed in at least three portions at predetermined intervals.

2. A display apparatus comprising a movably installed hemispherical rear projection screen, a projector for projecting an image onto the inner surface of the hemispherical rear projection screen to be displayed on the outer surface of the rear projection screen, and a computer system for creating an image projected from the projector, wherein the computer system comprises a recording medium for storing image data of a plane image, creation means for correcting image data stored to the recording medium and creating image data of a curved image, and transmission means for transmitting the image data of the curved image created by the creation means to the projector, and wherein the display apparatus further comprises one or a plurality of plane reflection means disposed between the projector and the inner surface of the hemispherical rear projection screen that reflect a luminous flux output from the projector onto the inner surface of the hemispherical projector; and wherein the display apparatus further comprises detection means capable of detecting displacement of the rear projection screen, and the computer system reads, when the rear projection screen is displaced, image data corresponding to the displacement of the rear projection screen from the image data stored in the recording medium in response to signals output from the detection means, creates image data of a curved image by correcting the image data by the creation means, and transmits the image data of the created curved image to the projector by the transmission means; and wherein the detection means comprise arms for sensing displacement of the rear projection screen, wherein the arms are coupled with the rear projection screen through joint members, and wherein the detection means are composed of two-axis displacement sensors and disposed in at least three portions at predetermined intervals.

* * * * *